United States Patent Office 3,425,435
Patented Feb. 4, 1969

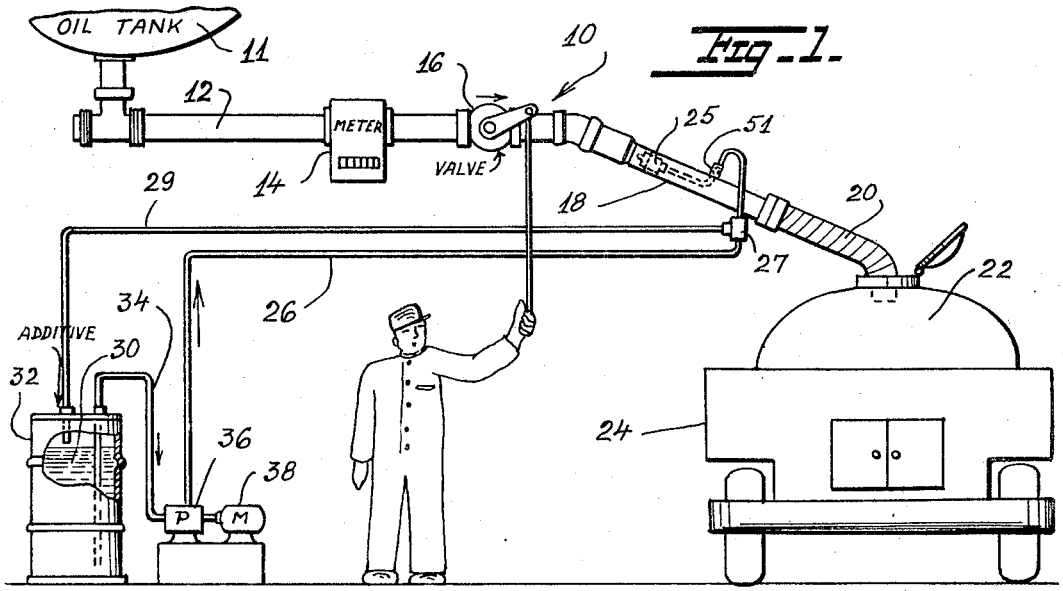
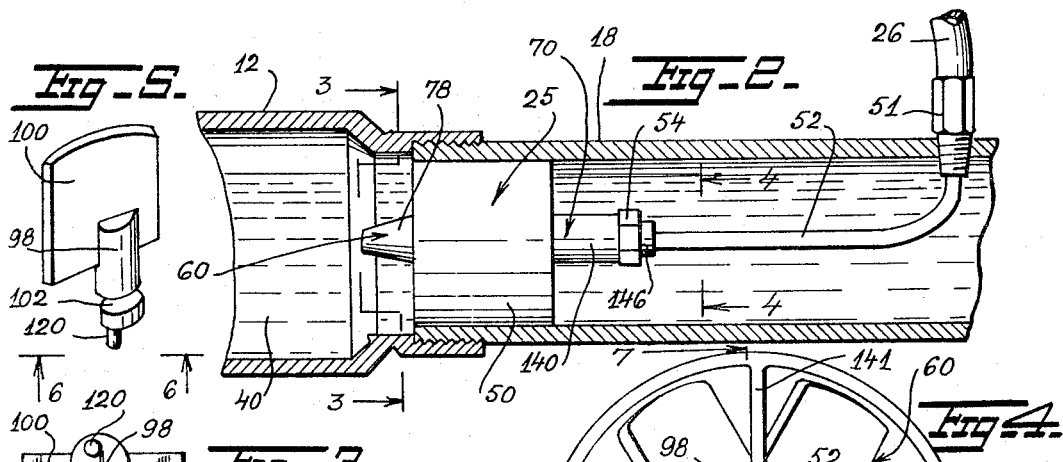
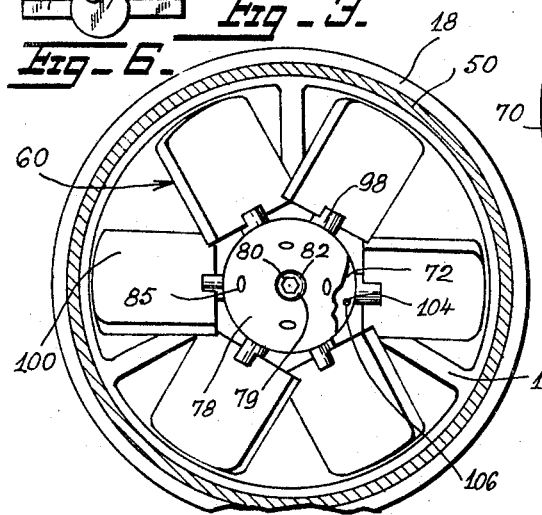

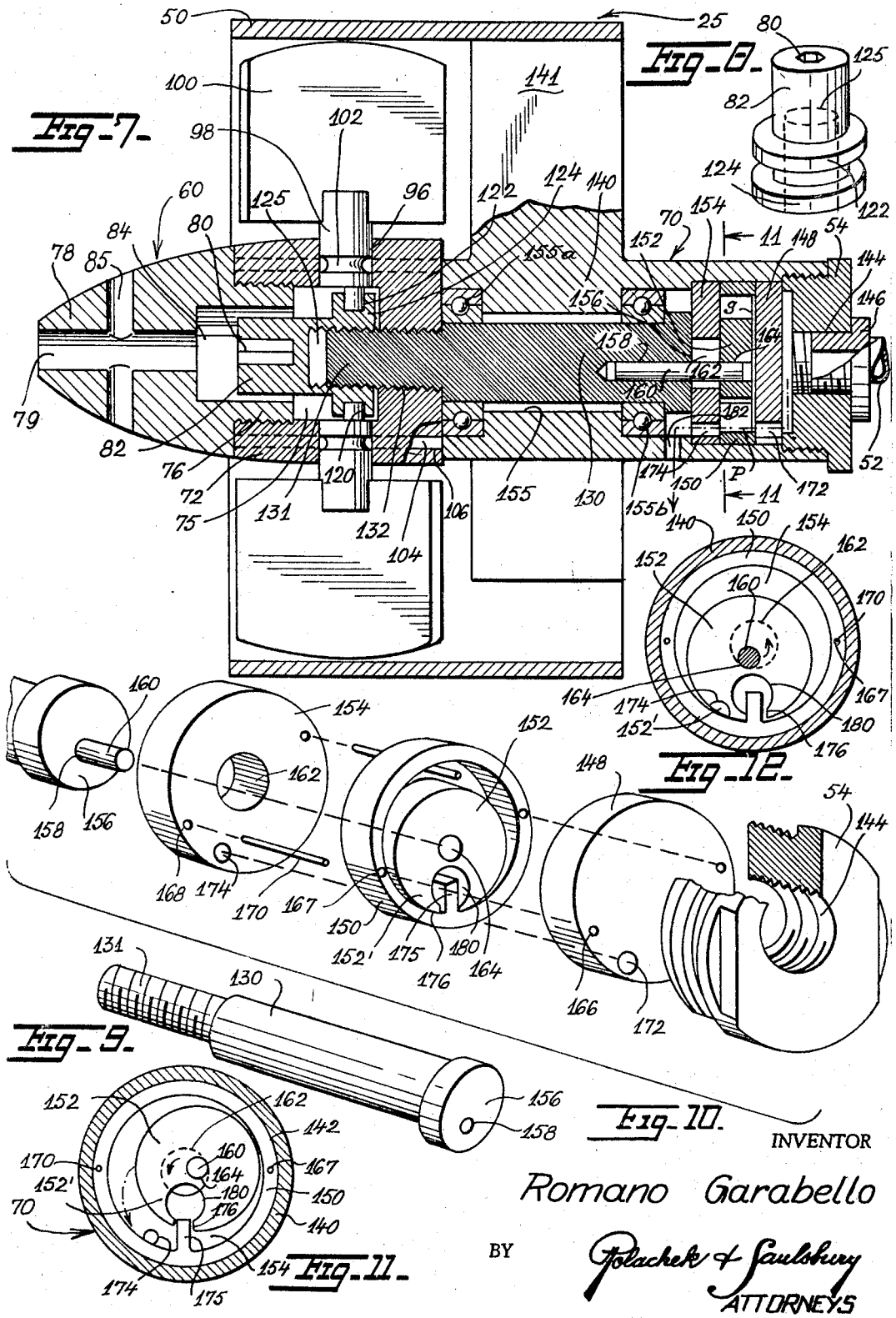

3,425,435
ROTARY OSCILLATING PISTON PUMP ADDITIVE INJECTION DEVICE FOR FLUID DELIVERY SYSTEM
Romano Garabello, Brooklyn, N.Y., assignor, by mesne assignments, to Metropolitan Petrochemicals Co., Inc., New York, N.Y., a corporation of New York
Filed Sept. 28, 1966, Ser. No. 582,560
U.S. Cl. 137—99                                    10 Claims
Int. Cl. B67d 5/56; B01f 3/08; G05d 11/03

This invention relates generally to fluid distribution systems and more particularly concerns a device for injecting an additive fluid in predetermined proportions into a fluid supply line.

The invention is especially applicable to a system in which fuel oil is pumped from a supply thereof through a main supply conduit to a consumer's oil tank or to a storage tank. It is desired to feed a fluid additive to the oil passing through the conduit, the rate of feed of the additive depending on the rate of flow of the fuel oil in the conduit. The present invention makes this possible.

According to the invention there is provided a device which can be mounted in a main fuel oil supply line or conduit. The device includes a rotary oscillating piston pump type revolving valve which is actuated in response to the flow of fuel oil in the main supply conduit to permit discharge of additive fluid in predetermined proportions into the conduit. The valve has an element which is revolved by a rotating shaft driven by a rotor having vanes immersed in the fuel oil in the main supply conduit and driven by the moving fuel oil. Mechanical means may be provided whereby the pitch of the vanes can be adjustably positioned so that the speed of rotation of the shaft can be selectively adjusted with respect to the rate of flow of the fuel oil. The device is a compact automatically operated unit which requires no particular care or maintenance after installation.

It is therefore a principal object of the invention to provide a device for injecting an additive fluid into a main fluid supply line or conduit.

It is another object to provide a device of the character described with a rotary-oscillating pump valve element revolved by a rotating shaft driven by the main stream of fluid in the supply line for injecting the additive fluid in at a variable rate depending on the rate of flow of the main stream.

A further object is to provide a device of the character described wherein the rotating shaft is driven by a multiple vaned rotor.

Still another object is to provide a device as described wherein the vanes of the rotor are adjustably positioned for selectively determining the rate of injection of the additive into the main stream.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a side view of a fluid delivery system, with a fluid additive injection evice embodying the invention installed therein.

FIG. 2 is a longitudinal sectional view on an enlarged scale through a fluid delivery conduit of the system of FIG. 1, showing the device in side elevation.

FIGS. 3 and 4 are enlarged sectional views taken on lines 3—3 and 4—4 respectively of FIG. 2 and showing opposite ends of the device.

FIG. 5 is a perspective view of a rotor vane.

FIG. 6 is a bottom plan view of the vane taken on line 6—6 of FIG. 5.

FIG. 7 is a further enlarged longitudinal sectional view taken on line 7—7 of FIG. 4.

FIG. 8 is a perspective view of an adjustment nut employed in the rotor.

FIG. 9 is a perspective view of a rotary shaft employed in the device.

FIG. 10 is an exploded perspective view of parts of a valve assembly employed in the device.

FIG. 11 is a cross sectional view taken on line 11—11 of FIG. 7, showing valve elements in one position with an open passage therethrough.

FIG. 12 is a view similar to FIG. 11 showing the valve elements in another position with the passage closed.

The system 10 shown in FIG. 1 includes a fuel oil supply tank 11 having a supply pipe 12 in which is a meter 14 for measuring oil flow and a manually controllable valve 16 for starting and stopping oil flow through discharge conduit 18 connected to pipe 12. A flexible hose 20 is connected to conduit 18 for discharging the fuel oil into a tank 22 of a delivery truck 24. In conduit 18 is an additive fluid injector device 25. Connected to this device is an additive fluid supply pipe line 26. The additive fluid 30 is shown contained in a drum 32 and is drawn out via tube 34 by a pump 36 driven by motor 38. The pipe line 26 is connected to the outlet of the pump and feeds the additive fluid to the injector device 25 in conduit 18 automatically for mixing with the main stream of fuel oil in the conduit. In the supply line 26 is a T-fitting 27 from which an overflow pipe 29 returns excess additive to the drum 32. To the extent described, the system is the invention of Sidney J. Reiser and Larry Reiser and forms the subject of a copending application filed by them. The present invention involves the device 25 per se which will now be described in connection with FIGS. 2–12 to which reference is now made.

In FIG. 2, conduit 18 is shown coupled to pipe 12 to receive fuel oil 40 therefrom. The device 25 is installed at the inlet end of conduit 18. The device 25 includes an external cylindrical ring 50 securely and non-rotatably mounted inside of conduit 18 in axial alignment therewith. Fluid additive supply line 26 is connected to a fitting 51 in a side of conduit 18. A connecting tube or pipe 52 is connected to the inlet end of the device at plug 54. The device 25 has a rotor 60 and a stator 70 best shown in FIGS. 3–7.

The rotor 60 has a tubular body 72 formed with an internal cavity 75. The wall of the cavity is threaded and removably engages threaded nipple 76 of a tapered nut 78. The nut has a central bore 79 through which a hexagonal wrench can be inserted for engagement in hexagonal hole 80 of an adjustment nut 82. The head of the nut is located in recess 84 of nut 78; see FIG. 7. Lateral holes 85 in nut 78 can be engaged by a spanner wrench for removing and replacing nut 78 on body 72.

In body 72 is a plurality of radial circumferentially spaced bores 96 opening into cavity 75. Generally cylindrical shanks 98 of vanes 100 fit rotatably in bores 96. Each shank has a circumferential groove 102 engaged by a different one of pins 104 inserted axially of body 72 in bores 106. Short keys 120 extend inwardly of cavity 75 from the ends of shanks 98. Each key 120 is eccentrically located at the end of a shank 98 as clearly shown in FIGS. 5, 6 and 7. The keys are engaged in a circumferential groove 122 formed in the cylindrical body 124 of nut 82; see FIGS. 7, 8. Nut 82 has an internally threaded axial bore 125 and is engaged on one end 131 of rotatable shaft 130. The shaft 130 is screwed into threaded bore 132 of body 72 and is locked securely to this body so that the shaft, body, and vanes rotate together with nuts 78, 82 as a unit. The nut 82 can be axially advanced or retracted on the threaded end 131 of shaft 130. This rotates and advances or retracts all keys 120 simultaneously axially of the rotor 60. Movement of the keys causes the shanks 98 to rotate simultaneously so that the vanes 100 all turn. The pitch of the overlapping vanes is thus easily adjusted.

Vanes 100 extend radially outward of the rotor 60 inside of ring 50 and are disposed so that their planes are angularly disposed to the axis of the rotor and ring. Thus when the fuel oil 40 flows through the conduit 18 and ring 50, the rotor is caused to turn circumferentially inside the ring.

The stator 70 of device 25 has a cylindrical body 140 provided with external radial spider arms 141 which are secured to the interior of ring 50 so that the body 140 extends axially of the ring in axial alignment with rotor 60. In body 140 is a generally cylindrical chamber 142. The chamber 142 has an open internally threaded end in which is screwed plug 54. Pipe 52 is connected to central bore 144 in the plug by a fitting 146.

Inside of chamber 142 is an assembly of valve elements. A flat circular plate 148 is abutted by plug 54. Adjacent this plug is a spacer ring 150 in which is an eccentrically revolvable valve disk 152. Disk 152 is slightly thinner than ring 150. Adjacent ring 150 is apertured valve plate 154. Shaft 130 rotates in chamber 142 and is journaled to bore 155, by spaced ball bearing assemblies 155 and 155b. The flat end 156 of shaft 130 has an eccentrically located blind bore 158 in which is seated a pin 160. The pin extends axially out of bore 158 through hole 162 of plate 154 and terminates in central hole 164 of disk 152 to revolve this disk with shaft 130.

Plates 148 and 154 and ring 150 have registering diametrically spaced holes 166, 167 and 168 through which extend pins 170. These pins serve to align and hold the plates and ring in relatively fixed position inside of chamber 142. The plug 54 effectively holds the assembly of plates 148, 154 and ring 150 stationary in body 140. In plate 148 is a hole 172 located off center and aligned with a similarly located hole 174 in plate 154. Ring 150 has a short radially extending internal arm 175. Disk 152 has a lateral slot 176 opening into a cylindrical hole 180. Arm 175 fits into hole 180 through slot 176 and serves as a guide during revolution of disk 152. Disk 152 is eccentrically revolved rather than rotated since it follows a path of revolution determined by the locus of pin 160 which moves around the wall of hole 162 in plate 154.

It will be apparent from an inspection of FIGS. 11 and 12, that when the disk 152 revolves and is elevated as shown in FIG. 11 it clears a passage from hole 172 to hole 174 through ring 150. In a lower position of the disk as shown in FIG. 12, a corner 152′ of the disk blocks the passage between the holes 172 and 174. It should be understood that the clearance between or space S between the disk 152 and plate 148 or 150 is only a few ten thousandths of an inch so that the passage between holes 172 and 174 is effectively blocked while free revolution of the disk is permitted.

In body 140 is a lateral hole 182 providing communication between chamber 142 and the exterior of body 140 which is surrounded by oil 40 in conduit 18. Additive fluid is supplied to chamber 142 via pipe 52 and passed through bore 144, hole 172, ring 150 and hole 174 in path P shown by dotted line in FIG. 7. The fluid leaves the body 140 of stator 70 through hole 180.

During operation of the device 25, the fuel oil 40 flowing through conduit 18 and ring 50 will turn the vanes 100 so that rotor 60 rotates continuously. The speed of the rotor is determined by the rate of flow of the oil in conduit 18. As the rotor turns, disk 152 is revolved and the path P is open and closed once during each revolution as disk 152 alternately clears and then blocks hole 174 in plate 154. The additive fluid is thus emitted in spurts into the flowing stream of oil 40 at a rate depending on the speed of flow of the oil. Additive fluid mixes with the oil and is discharged therewith through discharge hose 20. The rate of additive fluid ejection depends on the speed of rotation of rotor 90. This speed depends on the speed of flow of the fuel oil and on the pitch of overlapping vanes 100 as set by nut 82 in rotor 60.

The pitch of the vanes is set by advancing or retracting nut 82 on shaft end 131 by turning the nut with a suitable wrench. When the pitch of the vanes is set, the rotor 60 will turn at a predetermined speed for any given speed of oil flow.

There has thus been provided a fluid ejection device whose rate of fluid ejection is determined by the speed of flow of liquid fluid in a main stream thereof surrounding the rotor and stator of the device. The fluid ejection is determined by automatically opening and closing valve elements in the device. It will be understood that the device can be used in other fluid or liquid distribution systems than the particular fuel oil delivery system described.

While I have illustrated and described the preferred embodiments of my invention it is to be understood that I do not limit myself to the precise construction herein disclosed and that various changes and modifications may be made within the scope of the invention as defined in the appended claims.

What is claimed is:

1. A device for injecting an additive fluid into a main stream of liquid flowing in a conduit, comprising a stator having a generally cylindrical body, means for supporting said stator in a stationary position inside and axially of said conduit so that said stream of liquid passes by and around said body, said body having an axially extending chamber, a shaft rotatably supported in said chamber and extending axially therein, means preventing axial movement of the shaft in said body, a rotor having multiple radially extending vanes pitched at an angle to the axis of said body, said rotor being rotatably supported at and by one end of said shaft outside said body so that said liquid flowing in said conduit turns the rotor, revolvable valve means in said body, said body having an inlet opening at one end for said additive fluid, said body having an outlet opening communicating with said chamber, said valve means being disposed in said chamber in a passage for fluid between said inlet and outlet openings, and means operatively interconnecting said shaft and valve means so that the valve means alternately opens and closes said passage to discharge said additive fluid into said stream of liquid when the rotor rotates in said stream of liquid.

2. A device as recited in claim 1, further comprising a ring securable in said conduit in axial alignment therewith, the first named means for supporting said stator comprising spider arms interconnecting said body and said ring so that the stator is spaced radially from the ring to permit passage of said stream of liquid along and around said body.

3. A device as recited in claim 1, wherein said rotor comprises a generally cylindrical other body having a plurality of circumferentially spaced bores, said vanes having cylindrical shanks rotatably disposed in said spaced bores respectively, a pin extending outwardly of one end of each shank and disposed eccentrically of the shank, a nut rotatably engaged on said one end of the shaft for advancing and retracting the nut, said nut having a circumferential groove, each of the pins being engaged in said groove so that rotation of said nut turns all the vanes on said shanks to change the pitch of all the vanes simultaneously.

4. A device as recited in claim 3, wherein said rotor has a tapered other nut removably engaged on said other body, said other nut having a central hole providing access to the first named nut for turning the same to adjust the pitch of the vanes.

5. A device as recited in claim 1, wherein said rotor comprises a generally cylindrical other body, and means rotatably and adjustably supporting said vanes on said toher body so that the pitch of the vanes is selectively adjustable.

6. A device as recited in claim 1, wherein said revolvable valve means comprises a centrally apertured disk, and a pin eccentrically carried by said shaft at one end theerof and engage in the central aperture of the disk to revolve the same.

7. A device as recited in claim 1, wherein said valve means comprises a plate hvaing a centrally located first hole and a second hole spaced radially from the first hole, a spacer ring adjacent to said plate, means holding said plate and ring in fixed position inside said chamber, a disk having a central hole, a pin eccentrically carried by said shaft at one end thereof, said pin extending through said first hole in said plate and engaged in said central hole in the disk to revolve the same when the shaft rotates, said ring having guide means engaged with said disk to guide the same in such a path that said disk alternately clears and blocks said second hole in said plate for intermittently passing said additive fluid through said second hole to the outlet opening.

8. A device as recited in claim 7, wherein said valve means further comprises a second plate abutted to said spacer ring, said second plate having another hole aligned with said second hole in the first named plate, whereby said disk alternately clears and blocks both said second hole and siad other hole in the first and second plates respectively.

9. A device as recited in claim 8, wherein said guide means comprises an arm projecting radially inwardly of said ring, and wherein said disk has a radially inwardly extending enlarged slot receiving said arm so that the disk is constrained to revolve while rotation thereof is prevented.

10. A device as recited in claim 1, further comprising another ring securable in said conduit in axial alignment therewith, the first named means for supporting the stator comprising spider arms interconnecting said body and said other ring so that the stator is spaced radially from the other ring to permit passage of said stream of liquid along and around said rotor and stator; said rotor comprising a generally cylindrical other body having a plurality of circumferentially spaced bores respectively, a pin extending outwardly of one end of each shank and disposed eccentrically of the shank, a nut rotatably engaged on said one end of the shaft for advancing and retracting the nut, said nut having a circumferential groove, each of the pins being engaged in said groove so that rotation of said nut turns all the vanes on said shanks to change the pitch of all the vanes simultaneously.

References Cited

UNITED STATES PATENTS

| | | | |
|---|---|---|---|
| 465,050 | 12/1891 | Rand | 103—118 |
| 1,626,056 | 4/1927 | Thompson | 170—160.1 |
| 2,148,671 | 2/1939 | Allen | 137—99 |

HAROLD W. WEAKLEY, *Primary Examiner.*

U.S. Cl. X.R.

170—160.48; 103—87, 118

Disclaimer 3,425,435.—*Romano Garabello*, Brooklyn, N.Y. ROTARY OSCILLATING PISTON PUMP ADDITIVE INJECTION DEVICE FOR FLUID DELIVERY SYSTEM. Patent dated Feb. 4, 1969. Disclaimer filed Feb. 9, 1972, by the assignee, *Metropolitan Petroleum Petrochemicals Co., Inc.*

Hereby enters this disclaimer to claims 1, 2, 3, 4, 5, 6, 7, 8, 9 and 10 of said patent.

[*Official Gazette August 1, 1972.*]